(12) United States Patent
Guhr

(10) Patent No.: US 6,506,137 B2
(45) Date of Patent: Jan. 14, 2003

(54) TENSION DEVICE FOR A FLEXIBLE DRIVE ELEMENT

(75) Inventor: Wolfgang Guhr, Grundau (DE)

(73) Assignee: Litens Automotive GmbH, Gelnhausen (DE)

(*) Notice: Subject to any disclaimer, the term of this patent is extended or adjusted under 35 U.S.C. 154(b) by 0 days.

(21) Appl. No.: 09/758,171

(22) Filed: Jan. 12, 2001

(65) Prior Publication Data

US 2001/0007839 A1 Jul. 12, 2001

(30) Foreign Application Priority Data

Jan. 12, 2000 (DE) .......................... 100 00 970

(51) Int. Cl.⁷ ................................ F16H 7/12
(52) U.S. Cl. ...................... 474/135; 474/134
(58) Field of Search ................ 474/101, 109, 474/133, 134, 135

(56) References Cited

U.S. PATENT DOCUMENTS

| 1,823,696 A | * | 9/1931 | Morse ........................ 474/89 |
| 3,811,332 A | * | 5/1974 | Brown et al. ............... 474/111 |
| 4,416,647 A | | 11/1983 | White, Jr. |
| 4,758,208 A | | 7/1988 | Bartos et al. |

FOREIGN PATENT DOCUMENTS

| DE | 4443103 | 5/1996 |
| DE | 19540706 | 7/1997 |
| DE | 198 22 632 | 11/1999 |
| GB | 156687 | 7/1920 |
| GB | 918162 | 2/1963 |
| GB | 2206175 A | 12/1988 |
| JP | 60196457 | 10/1985 |

* cited by examiner

Primary Examiner—Thomas R. Hannon
Assistant Examiner—Timothy McAnulty
(74) Attorney, Agent, or Firm—Pillsbury Winthrop LLP

(57) ABSTRACT

An automotive tension device features a pair of pulleys which are pivotally mounted on the same pivot arm. The pulleys are positioned within the drive system (e.g., a belt drive system) in such a manner that the moments relative to the pivot axis created by the force resultant of the driving member passing around each of the pulleys are oppositely directed. Thus, the pulleys provide rotational support for each other. The tension device and arrangement is positioned within a belt drive system having a combination starter/generator, wherein the crankshaft ordinarily drives the belt but the starter/generator drives the belt on engine startup (an arrangement which creates varying kinematic conditions within the belt). One of the pulleys bears against a first, crankshaft-driving portion of the driving member extending from the crankshaft pulley to the starter/generator pulley on the driving side of the crankshaft, and the other pulley bears against a second, starter/generator driving portion of the driving member extending from the starter/generator pulley to the crankshaft pulley on the driving side of the starter/generator pulley.

20 Claims, 3 Drawing Sheets

TENSION DEVICE FOR A FLEXIBLE DRIVE ELEMENT

FIELD OF THE INVENTION

The invention relates to an automotive belt tensioning device and configuration.

BACKGROUND OF THE INVENTION

It is known for internal combustion engine belt drives to incorporate along the path of the belt, which acts as the drive element, at least one tension device, which helps to avoid undesirable belt slippage and compensates for belt stretching. The belt drivingly connects the crankshaft with the generator (as well as other possible secondary engine components which are driven by the crankshaft) and may be redirected by (i.e., trained around) various redirecting pulleys, e.g., a tension pulley on a tension arm. Spring preloading around the tension arm swivel bearing acts on this tension pulley. Because all secondary components customarily are driven by the crankshaft, it is preferable and customary to position the tension pulley on the belt's nondriving side relative to the crankshaft.

A new development, used especially in automobile construction, incorporates the starter motor into the generator and starts the internal combustion engine by turning the crankshaft via the belt drive (as opposed to the usual method, where the internal combustion engine is started by the starter motor turning the flywheel via a starter motor pinion). When starting the engine using a combined starter/generator, the kinematic behavior of the belt drive is different than normal because the starter motor dives the crankshaft as opposed to vice-versa. Therefore, because the tension pulley is positioned on the ordinarily non-driving side of the crankshaft and the starter motor creates a relatively large and sudden torque, undesirable belt slippage and oscillations may result which the first tension pulley may not be able to suppress by itself, even with strong spring preloading.

SUMMARY OF THE INVENTION

The present invention solves these drawbacks or limitations of the prior art. The invention features a tension device having a pair of tension pulleys which are disposed within the engine drive system so as to tension the drive element. The tension device is positioned with the two tension pulleys engaging the drive member on opposite sides of the starter/generator pulley. Thus, one of the tension device pulleys engages the drive member at a position within the drive path corresponding to the "slack" position where a tensioner customarily might be located to tension the drive member when the crankshaft is driving the drive system, while the other pulley of the tension device is positioned at a location to take up slack in the drive member generated when the starter/generator is driving the drive member. Thus, the tension device of the invention provides proper tensioning under the differing kinematic conditions which arise when the starter/generator is driving the drive member (as opposed to when the crankshaft is driving the drive member).

Additionally, the pulley arrangement provides the drive element with enhanced stabilization and tensioning. The pulleys are positioned such that the applied forces result in oppositely directed moments relative to the tension device pivot axis, and the oppositely directed moments vary relative to one another depending on whether the drive element applies more force to the first tension pulley or the second tension pulley. Since both moments are transmitted through the swivel bearing, the two tension pulleys provide support for one another, thereby producing stable movement of the drive element even when the drive undergoes varying kinematic conditions. This is especially advantageous for a drive incorporating a combination generator/starter because the generator/starter drives the crankshaft during starting of the internal combustion engine, whereas the crankshaft drives the generator during normal engine operation. The two tension pulleys work together because a yielding movement by one of the tension pulleys causes the other tension pulley to move so as to produce an increase in tension.

In a drive system having a starter motor that is incorporated into the generator and that can be activated at will, it is advantageous to position the second tension pulley so as to engage the drive element on the driving side of the starting motor as a starting tension pulley. Such an arrangement can prevent or reduce slippage or undesirable strong oscillation of the drive element resulting from the strong force applied to the crankshaft by the starting motor via the drive element. The tension device arrangement of the invention is particularly suited to a belt drive which has a drive element that consists of at least one V-belt, grooved belt, or cog belt.

Various specific geometric configurations can be used to obtain the benefit of a strong force applied to one tension pulley pushing the other tension pulley into the drive element with increasing force. For example, the axes of the tension pulleys may be on the same side or on opposite sides of the swivel bearing; both axes may be on a single straight line passing through the swivel bearing; or each axis may be on a separate line passing through the swivel bearing, with the two lines forming an angle with each other. The particular geometry that is chosen should be matched to the path of the drive element in the drive, thereby ensuring that the tension device takes up relatively little space and can be positioned optimally within the drive.

In this regard, it is important that the first tension pulley preferably has a high tensioning capacity so that drive element length changes can be compensated for effectively and so that the increase in length that results when the second tension pulley yields can be taken up readily. Thus, if the first tension pulley compensates for a 5.5 mm increase in drive element length, for example, the second tension pulley should only introduce a significantly smaller increase in length, e.g., only 1 mm. The tensioning capacity of the first tension pulley should preferably be no less than 1:4. This can be achieved easily by appropriately designing the tension pulley lever arms so that they have a ratio of at least 1:4, preferably approximately 1:5.5. This guarantees that the first tension pulley has the high tensioning capacity mentioned above.

Preferably, the effective diameters of both tension pulleys are at least approximately the same, and preferably the drive element passes through the tension device in such a way it makes approximately equal contact with both tension pulleys.

The tension device preferably is spring preloaded as is customary. The spring preloading applies force to the first tension pulley, viz., the one with the high tensioning capacity, thereby forcing it in the direction of increasing tension. In order to damp drive element oscillations effectively and also in order to avoid slippage, it is preferable to provide rotational damping in the swivel bearing or for the tension lever.

In order to avoid damage to the drive in the case of extreme conditions that may occur, the tension arm should have a limited total swivel angle within which it should be able to carry out its working cycle. A total swivel angle of approximately 30° is preferable. If the total swivel angle in the swivel direction which causes a reduction of tension is limited by a mounting end stop, the drive element can be easily installed and removed.

BRIEF DESCRIPTION OF THE DRAWINGS

The invention will now be described in greater detail in connection with the drawings, in which.

DETAILED DESCRIPTION OF PREFERRED EMBODIMENTS OF THE INVENTION

Figure 2:
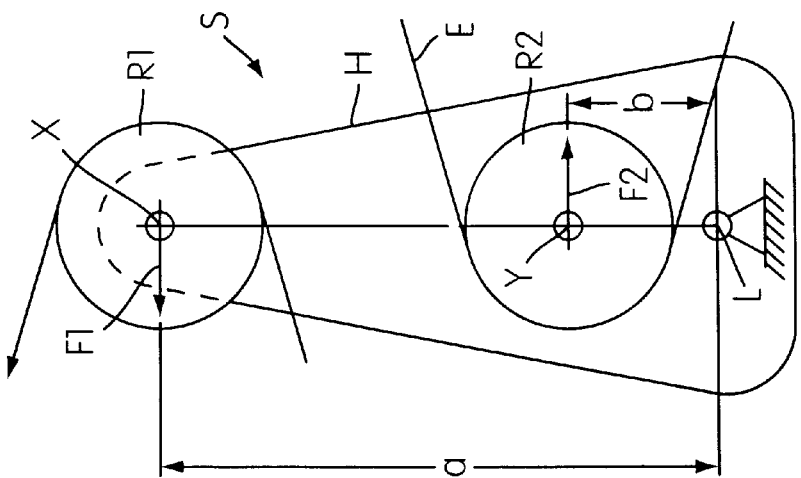
FIG. 2 is an elevation view showing a second embodiment of a tensioner device and configuration according to the invention.
Figure 1:
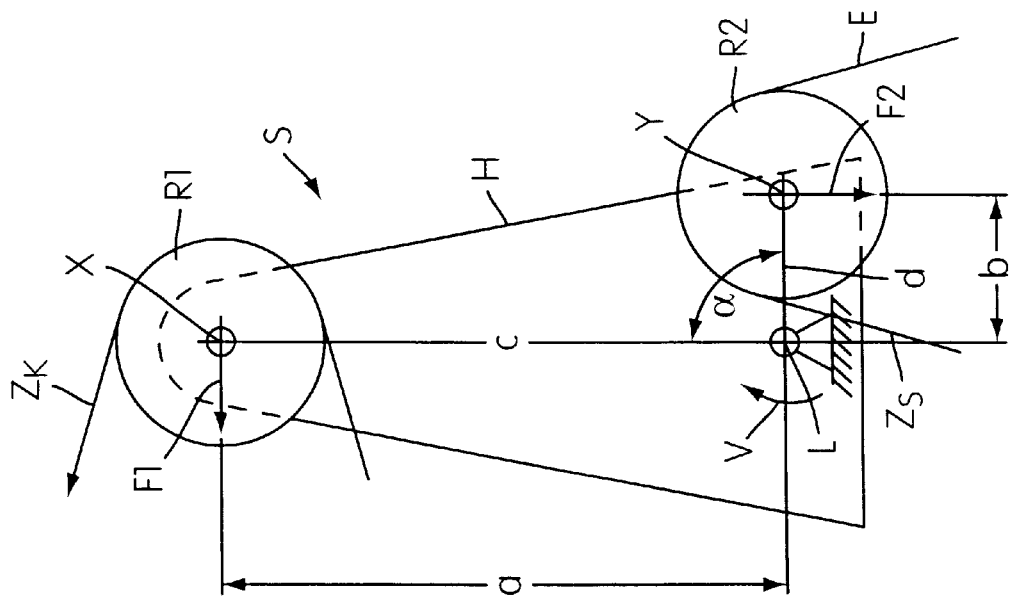
FIG. 1 is an elevation view showing a first embodiment of a tensioner device and configuration according to the invention.
Figure 3:
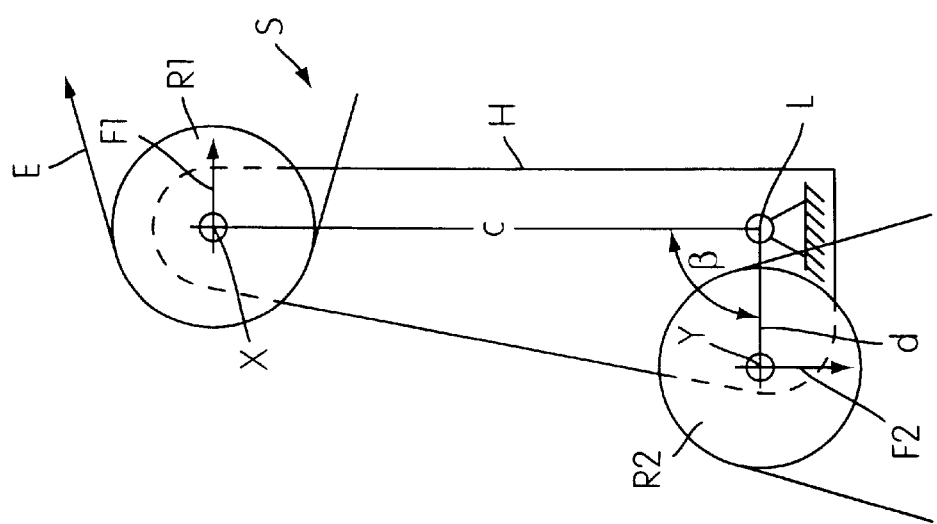
FIG. 3 is an elevation view showing a third embodiment of tensioner device and configuration according to the invention.

Three different configurations of a tension device S according to the invention are shown in FIGS. 1, 2, and 3. Typically, the tension device S is a belt tensioner for an internal combustion engine belt drive which drives several secondary components such as an air conditioner compressor, a water pump, a generator, etc., by means of the crankshaft. The device has a tension arm H, which is supported in a stationary swivel bearing L in such a manner that it is able to swivel.

A first tension pulley R1 is positioned at axis X on tension arm H, and a second tension pulley R2 is positioned at axis Y on tension arm H. The lever arm a of axis X is considerably longer than the lever arm b of axis Y (both lengths being determined relative to swivel bearing L). The connecting line c between axis X and the swivel bearing L and the connecting line d between axis Y and the swivel bearing L form an acute angle α, which may be close to 90°.

Force is applied to both tension pulleys R1, R2 by the same drive element E, which is for example a belt or a chain, with drive element E preferably having approximately the same degree or extent of contact with both tension pulleys R1, R2. The first tension pulley R1 is positioned, for example, so as to bear against the drive element E on the driving side $Z_K$ of the crankshaft (which is not shown in FIG. 1) and has a contact resultant F1 applied to it, which acts counterclockwise relative to swivel bearing L. On the other hand, the second tension pulley R2 is positioned so as to bear against the drive element E on the driving side $Z_S$ of a starter/generator (which is not shown in FIG. 1), and has contact resultant F2 applied to it, which acts clockwise relative to swivel bearing L. Thus the resultants F1, F2 form an opposing moment pair.

A spring preloading device V applies a force to tension arm H acting clockwise around swivel bearing L. If necessary, rotational damping is also provided in swivel bearing L. The lever arm ratio b:a should be at least approximately 1:4, preferably approximately 1:5.5, or at least within the range of about 1:4.5 to 1:6.5.

If the first tension pulley R1 has to compensate for a lengthening of drive element E, tension arm H swivels clockwise as a result of the preloading. The second tension pulley R2 follows this motion. Because lever arm b is considerably shorter than lever arm a, the amount of the drive element "released" by this motion of the second tension pulley R2 is considerably shorter than the amount of drive element slack compensated for by the first tension pulley R1. The first tension pulley R1 therefore has a high tensioning capacity. If, on the other hand, the first tension pulley R1 is shifted counterclockwise by a momentary increase in tensile force on the driving side $Z_K$ of the crankshaft, then support is provided by the spring preloading and by the drive element E acting on the second tension pulley R2. Conversely, a momentary increase in tensile force on the driving side $Z_S$ of the starter/generator causes contact resultant F2 to increase and tends to swivel tension arm H clockwise, simultaneously increasing the support provided to the first tension pulley R1 by drive element E. In this way, the play motion of tension arm H is guaranteed to be moderate during varying kinematic conditions in the drive, while the high tensioning capacity of the first tension pulley R1 is continuously maintained and drive element E remains under tension.

In the tension device embodiment in FIG. 2, both of the pulley axes X and Y lie on the same side of swivel bearing L, on a straight line that also passes through swivel bearing L, with lever arms a and b differing significantly from each other. As shown in FIG. 2, the amount of contact on both of the tension pulleys R1, R2 is greater than in FIG. 1. Contact resultants F1, F2 form an opposing moment pair relative to swivel bearing L.

In the embodiment of the tension device S of FIG. 3, the axes X and Y of tension pulleys R1 and R2 are positioned on opposite sides of swivel bearing L. The lever arms of axes X and Y differ significantly from each other. The connecting lines between axes X and Y and the swivel bearing L form, for example, an obtuse angle β. It is also possible to arrange the axes X and Y on opposite sides of swivel bearing L so that they lie on a straight line passing through swivel bearing L.

Figure 4:
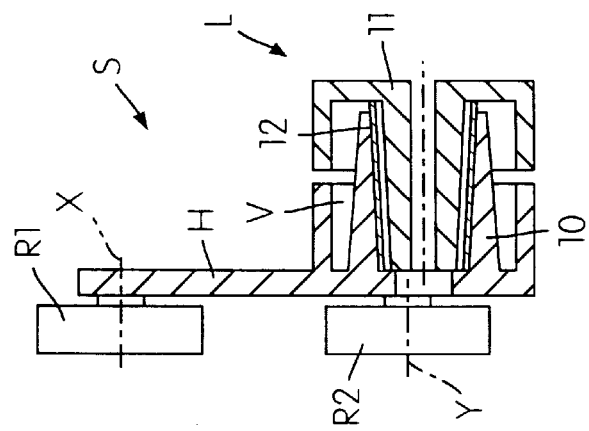
FIG. 4 is a section view, e.g., through the embodiment illustrated in FIG. 1, illustrating the swivel bearing of the tensioner device.

In the section view shown in FIG. 4, it can be seen that the axes X and Y of the first and second tension pulleys R1 and R2 are parallel to each other and parallel to the axis of tension arm H, which passes through swivel bearing L. Tension arm H is pivot bearing-mounted with bushing 10 on tensioner casing 11, with tension arm bearing 12 positioned in between. The spring preloading device V can be positioned in the cavity between casing 11 and bushing 10. Bearing 12 can be designed to function as a rotational damper.

Figure 5:
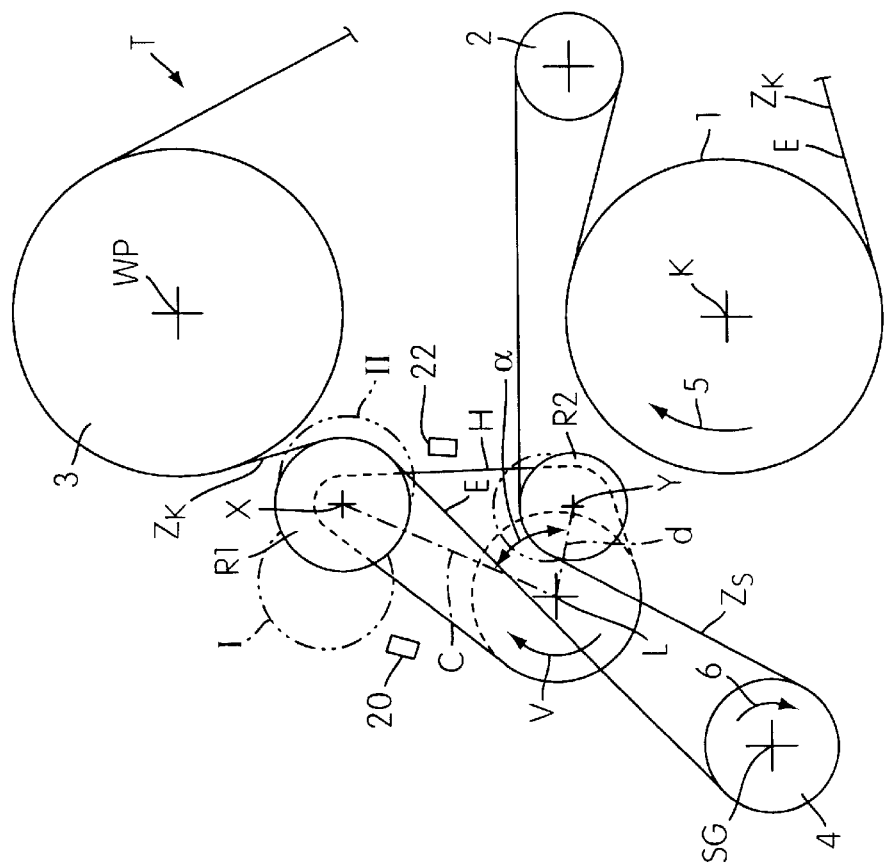
FIG. 5 is a schematic view illustrating the belt drive system of an internal combustion engine having a combination starter/generator incorporating a tensioner device configuration as illustrated in FIG. 1.

The tension device S may be installed on the front side of an internal combustion engine and as part of a drive system T, e.g., a belt drive system, as shown schematically in FIG. 5. Drive T has several belt pulleys and a belt which acts as a drive element E to connect the belt pulleys. Belt pulley 1 is connected to crankshaft K of the internal combustion engine, whose direction of rotation is indicated by arrow 5.

In order to ensure strong contact between the belt E and belt pulley 1, redirecting pulley 2 is positioned near belt pulley 1. Another belt pulley 3 is, for example, connected to and drives a water pump WP, while another belt pulley 4 is connected to and drives a combination generator/starter motor (SG). The direction of rotation of belt pulley 4 is indicated by arrow 6. When crankshaft K is applying power, the driving side portion $Z_K$ of the drive element E extends from the lower side of the belt pulley 1 to the upper side of the belt pulley 4. Conversely, when the starter motor is switched on such that the pulley 4 becomes the driving pulley, the driving side $Z_S$ of the drive element E extends from the lower side of belt pulley 4 to the upper side of belt pulley 1.

It will be appreciated that tension device S is positioned in drive system T so that 1) the first tension pulley R1 is positioned on the driving side of crankshaft K and bears against the portion $Z_K$ of the belt which is the driving portion when the crankshaft is driving the system T, and 2) the second tension pulley R2 is positioned on the driving side of the starting motor and bears against the portion $Z_S$ of the belt which is the driving portion when the starter/generator is driving the system T. The drive element E makes approximately the same amount of contact with tension pulleys R1 and R2.

Tension arm H is shown in its nominal position in FIG. 5 using solid lines. It preferably has a limited swivel angle, which is highlighted by the dot-dashed contours of the first tension pulley R1. This total swivel angle, which for example is approximately 30°, can be limited by end stops, e.g. a mounting stop 20 for a mounting position I and an end stop 22 for an end position II. If tension arm H is pivoted to mounting position I, sufficient tension is removed from drive element E so that it can be easily removed if necessary. The tension device S in FIG. 5 essentially corresponds to the first embodiment of the tension device shown in FIG. 1.

Figure 6:
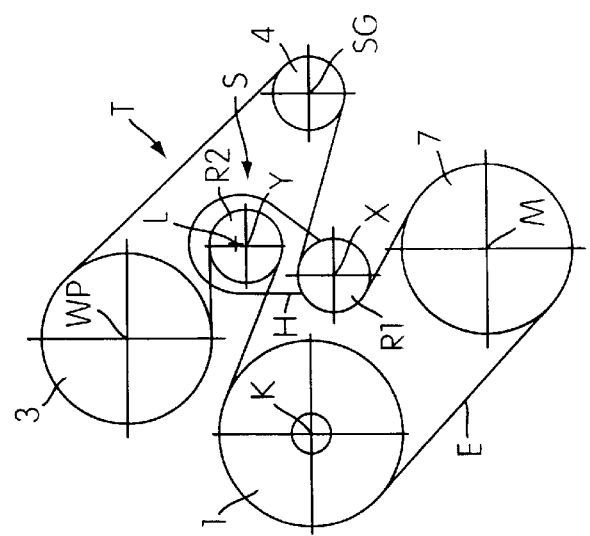
FIG. 6 is a schematic view illustrating the belt drive system of an internal combustion engine having a combination starter/generator incorporating a tensioner device configuration as illustrated in FIG. 2.

The tension device S in drive system T in FIG. 6 corresponds approximately to the embodiment of the tension device shown in FIG. 2. Another geometry for the path of drive element E has been selected in drive T in FIG. 6. For example, the clockwise-rotating belt pulley 1 of crankshaft K pulls drive element E along a path extending from belt pulley 4 of the starter/generator SG over belt pulley 7 of, for example, an air conditioner compressor M, and over the first tension pulley R1. When the starter/generator SG is switched on, belt pulley 4 pulls the drive element E along a path extending from belt pulley 1 of crankshaft K, over belt pulley 3 of, for example, water pump WP, and over the second tension pulley R2. Tension arm H is mounted so that it hangs with swivel bearing L positioned above and axes X and Y below. The amount of contact between the drive element E and tension pulleys R1 and R2 is considerably greater in FIG. 6 than in FIG. 5.

In a specific embodiment of the tension device S, the lever arm of the first tension pulley is approximately 88 mm long, while the lever arm of the second tension pulley R2 is only approximately 16 mm long, thus producing an optimal ratio of 5.5:1. If the first tension pulley R1 in this configuration compensates for a belt lengthening of 5.5 mm, the second tension pulley R2 moves approximately 1.0 mm, so that the belt is actually tensioned by approximately 4.5 mm.

In all embodiments, the strong force applied to the drive element when the starting motor is switched on is easily transmitted over the second tension pulley R2 with negligible slippage to belt pulley 4 or belt pulley 1, because the first tension pulley R1 pressing into drive element E provides support to the second tension pulley R2. Conversely, when power is applied by crankshaft K, support is provided to the first tension pulley R1 by the second tension pulley R2 as well as the spring preloading.

These and other configurations are deemed to be within the scope of the following claims.

What is claimed is:

1. An automotive assembly, comprising:
    an engine having a crankshaft and a starter/generator, said crankshaft having a crankshaft pulley attached to it and said starter/generator having a starter/generator pulley attached to it, said starter/generator being selectively operable in an engine-starting mode;
    an endless loop drive member drivingly interconnecting said crankshaft pulley and said starter/generator pulley such that 1) said crankshaft drives said starter/generator via said drive member during ordinary engine operation, and 2) said starter/generator drives said crankshaft to start said engine when in said engine-starting mode; wherein a first portion of said drive member extending from said crankshaft pulley toward said starter/generator pulley is in relative tension and a second portion of said drive member extending from said starter/generator pulley toward said crankshaft pulley is relatively slack when said crankshaft is driving said starter/generator during said ordinary engine operation and wherein said first portion of said drive member is relatively slack and said second portion of said drive member is in relative tension when said starter/generator is driving said crankshaft during said engine-starting mode; and wherein said crankshaft pulley, said starter/generator pulley, and said drive member each rotate in the same direction during said engine-starting mode as during said ordinary engine operation; and
    a tension assembly comprising first and second tension pulleys bearing against said first and second portions of said drive member, respectively, said tension pulleys being constructed and arranged such that 1) said first tension pulley takes up additional slack in said first portion of said driving member and said second tension pulley simultaneously yields under increasing tension in said second portion of said driving member during said engine-starting mode, and 2) such that said second tension pulley takes up additional slack in said second portion of said driving member and said first tension pulley simultaneously yields under increasing tension in said first portion of said driving member during said ordinary engine operation, whereby said tension assembly automatically compensates for varying kinematic conditions in said drive member as the automotive assembly transitions between said engine-starting mode and said ordinary engine operation.

2. The automotive assembly of claim 1, wherein said tension assembly comprises a tension arm which pivots about a tension arm pivot axis and wherein said first and second tension pulleys are pivotally mounted to said tension arm and rotate about respective first and second pulley axes, said first and second tension pulleys being disposed such that first and second resultant forces created by said first and second portions of said drive member bearing against said first and second tension pulleys, respectively, generate opposing first and second moments relative to said tension arm pivot axis.

3. The automotive assembly of claim 2, wherein the distance between said tension arm pivot axis and said first pulley axis is different than the distance between said tension arm pivot axis and said second pulley axis.

4. The automotive assembly of claim 3, wherein the distance between said tension arm pivot axis and said first pulley axis is greater than the distance between said tension arm pivot axis and said second pulley axis.

5. The automotive assembly of claim 2, wherein said drive member is a power transmission belt and said first and second tension pulleys are belt pulleys.

6. The automotive assembly of claim 2, wherein said first and second pulley axes lie on the same side of said tension arm pivot axis.

7. The automotive assembly of claim 2, wherein said first and second pulley axes lie on opposite sides of said tension arm pivot axis.

8. The automotive assembly of claim 2, wherein a line passing through both pulley axes passes through said tension arm pivot axis.

9. The automotive assembly of claim 2, wherein a line passing through said tension arm pivot axis and said first pulley axis forms an acute angle with a line passing through said tension arm pivot axis and said second pulley axis, said acute angle being less than but almost equal to 90°.

10. The automotive assembly of claim 2, wherein a line passing through said tension arm pivot axis and said first pulley axis forms an obtuse angle with a line passing through said tension arm pivot axis and said second pulley axis, said obtuse angle being less than 180°.

11. The automotive assembly of claim 2, wherein said first tension pulley has a lever arm with respect to said tension arm pivot axis and said second tension pulley has a lever arm with respect to said tension arm pivot axis and wherein the ratio of the length of the lever arm of said first tension pulley to the length of the lever arm of said second tension pulley is between about 4:1 and about 6.5:1.

12. The automotive assembly of claim 2, wherein said first tension pulley has a lever arm with respect to said tension arm pivot axis and said second tension pulley has a lever arm with respect to said tension arm pivot axis and wherein the ratio of the lever arm of said first tension pulley to the lever arm of said second tension pulley is about 5.5:1.

13. The automotive assembly of claim 2, wherein said tension arm is spring-biased to pivot in a direction which causes said first tension pulley to apply tensioning force against said first portion of said driving member.

14. The automotive assembly of claim 2, wherein said tension assembly includes a bi-directional rotational damper.

15. The automotive assembly of claim 2, wherein said tension arm has a range of pivoting out of a nominal operating position, said nominal operating position being a position at which said first and second pulleys cause substantially equal deflection of said driving member, said range of pivoting being delimited by a maximum pivoting stop and by an assembly position stop.

16. The automotive assembly of claim 15, wherein said range of pivoting out of a nominal operating position is approximately 30°.

17. The automotive assembly of claim 1, wherein the ratio between a tensioning capacity of said first tension pulley and a tensioning capacity of said second tension pulley is at least 4:1.

18. The automotive assembly of claim 1, wherein the ratio between a tensioning capacity of said first tension pulley and a tensioning capacity of said second tension pulley is between about 4.5:1 and about 6.5:1.

19. The automotive assembly of claim 18, wherein the ratio between the tensioning capacity of said first tension pulley and the tensioning capacity of said second tension pulley is about 5.5:1.

20. A tension assembly for use in an engine having a crankshaft and a starter/generator, said crankshaft having a crankshaft pulley attached to it and said starter/generator having a starter/generator pulley attached to it, said starter/generator being selectively operable in an engine-starting mode; said engine including an endless loop drive member drivingly interconnecting said crankshaft pulley and said starter/generator pulley such that said crankshaft drives said starter/generator via said drive member during ordinary engine operation, and said starter/generator drives said crankshaft to start said engine when in said engine-starting mode; wherein a first portion of said drive member extending from said crankshaft pulley toward said starter/generator pulley is in relative tension and a second portion of said drive member extending from said starter/generator pulley toward said crankshaft pulley is relatively slack when said crankshaft is driving said starter/generator during said ordinary engine operation and wherein said first portion of said drive member is relatively slack and said second portion of said drive member is in relative tension when said starter/generator is driving said crankshaft during said engine-starting mode; and wherein said crankshaft pulley, said starter/generator pulley, and said drive member each rotate in the same direction during said engine-starting mode as during said ordinary engine operation; said tension assembly comprising:

first and second tension pulleys bearing against said first and second portions of said drive member, respectively, said tension pulleys being constructed and arranged such that said first tension pulley takes up additional slack in said first portion of said driving member and said second tension pulley simultaneously yields under increasing tension in said second portion of said driving member during said engine-starting mode, and such that said second tension pulley takes up additional slack in said second portion of said driving member and said first tension pulley simultaneously yields under increasing tension in said first portion of said driving member during said ordinary engine operation, whereby said tension assembly automatically compensates for varying kinematic conditions in said drive member as the automotive assembly transitions between said engine-starting mode and said ordinary engine operation.

* * * * *